(12) United States Patent
Feerick et al.

(10) Patent No.: US 11,958,218 B2
(45) Date of Patent: Apr. 16, 2024

(54) PROCESS FOR MOULDING POLYMERIC FOAM CORE SANDWICH ARTICLES

(71) Applicant: PALTECH, Galway (IE)

(72) Inventors: Patrick Feerick, Galway (IE); Adrian Doyle, Galway (IE)

(73) Assignee: Paltech, Galway (IE)

( * ) Notice: Subject to any disclaimer, the term of this patent is extended or adjusted under 35 U.S.C. 154(b) by 458 days.

(21) Appl. No.: 17/429,759

(22) PCT Filed: Feb. 3, 2020

(86) PCT No.: PCT/EP2020/052633
§ 371 (c)(1),
(2) Date: Aug. 10, 2021

(87) PCT Pub. No.: WO2020/164947
PCT Pub. Date: Aug. 20, 2020

(65) Prior Publication Data
US 2022/0126489 A1    Apr. 28, 2022

(30) Foreign Application Priority Data
Feb. 12, 2019  (EP) .................................... 19156572

(51) Int. Cl.
*B29C 44/06*         (2006.01)
*B29C 44/34*         (2006.01)
(Continued)

(52) U.S. Cl.
CPC .......... *B29C 44/06* (2013.01); *B29C 44/3403* (2013.01); *B29C 44/445* (2013.01); *B29K 2101/12* (2013.01); *B29K 2105/043* (2013.01); *B29K 2105/048* (2013.01); *B29K 2105/26* (2013.01); *B29K 2995/0097* (2013.01); *B29L 2023/22* (2013.01)

(58) Field of Classification Search
CPC ... B29C 44/06; B29C 44/3403; B29C 44/445; B29K 2101/12; B29K 2105/043; B29K 2105/048; B29K 2105/26; B29K 2995/0097; B29L 2023/22
See application file for complete search history.

(56) References Cited

U.S. PATENT DOCUMENTS

2015/0024187 A1    1/2015 Kutluoglu et al.

FOREIGN PATENT DOCUMENTS

WO    2017077332 A1    5/2017

OTHER PUBLICATIONS

Int'l Search Report for PCT/EP2020/052633, dated Mar. 5, 2020.

*Primary Examiner* — Ryan M Ochylski
(74) *Attorney, Agent, or Firm* — MaxGoLaw PLLC (57) ABSTRACT

A process for producing a polymeric article is provided that includes: sequentially filling a female mould (11) with a first, second, and third batches, wherein the first and third batches include first and third polymeric materials (1p, 3p), and the second batch includes a second polymeric material (2p) and a blowing agent (2b), closing the thus filled cavity with a lid (12) to form a mould defining a closed cavity (10c) of constant volume in time, heating the mould (10) to a processing temperature, to melt the first, second, and third polymeric materials (1p-3p) and to expand the second polymer agent by activation of the blowing agent, cooling and removing the lid (12) to open the cavity and extracting the polymeric article. At least the second polymeric material (2p) includes at least 50 wt. % of recycled polymer in the form of shredded flakes.

17 Claims, 3 Drawing Sheets

(51) Int. Cl.
  *B29C 44/44* (2006.01)
  *B29K 101/12* (2006.01)
  *B29K 105/04* (2006.01)
  *B29K 105/26* (2006.01)
  *B29L 23/00* (2006.01)

PROCESS FOR MOULDING POLYMERIC FOAM CORE SANDWICH ARTICLES

TECHNICAL FIELD

The present invention is in the field of low-cost production of polymeric foam core sandwich articles. In particular the present invention concerns the production of polymeric articles comprising a foam core sandwiched between two polymeric skins, optionally fibre reinforced. The present invention uses low-cost recycled polymers, directly after grinding of waste polymeric articles into flakes which can be used as such in the process of the present invention.

BACKGROUND OF THE INVENTION

Waste management of polymeric articles, such as PET bottles and the like, has become a major issue. Spent articles made of polymers can be ground, pelletized in an extruder and used again for manufacturing articles of lower grade than the original ones. The treatment of the recycled polymers to yield pellets remains relatively expensive considering that they can be used for lower grade articles only. High grade polymers can be recycled by breaking the chains of a recycled polymer by alcoholysis or hydrolysis, to yield monomers and oligomers which can be used to produce new polymers of high quality. This process is, however, expensive. There therefore remains a need for a process using recycled polymers which is low-cost and easy to implement.

WO2010001083 describes a process for moulding a plastic article comprising the steps of placing in the open position two half moulds each defining a cavity, heating the moulds by conduction to a temperature above the melting point of a given plastic material, placing the plastic material in particulate form into the moulds to form a skin lining each mould. An expandable filler material is placed in the plastic skin formed in one mould. One half mould is closed over the other half mould to create a completely closed mould cavity. With the heat, the expandable filler material expands and forms a foam core enclosed in the two plastic skins which are bonded to each other to form a continuous plastic shell. The moulds are cooled and opened to remove the moulded article. The foam core can be made of recycled waste polymeric material. The mould is, however, filled with polymers in the form of powder or particulate, which are relatively expensive.

EP2383095 describes a similar process, with skins being formed first in open half-moulds and then the half moulds are closed to form a closed cavity filled with an expandable filler forming a foam core upon expansion. The expandable filler can comprise recycled polymers. The polymers are added into the moulds in the form of plastic particles including powder, pellets.

The foregoing processes are useful for using recycled polymers in the foamed core. They, however, require the use of polymers in the form of powders or pellets, which require specific process steps, thus increasing the overall cost of production associated with the use of recycled particulate polymer. The present invention proposes a process allowing the extensive use of recycled polymers in a particulate form which reduces the production costs. These and other advantages are described in more details in the following sections.

SUMMARY OF THE INVENTION

The present invention is defined in the appended independent claims. Preferred embodiments are defined in the dependent claims. In particular, the present invention concerns a process for producing a polymeric article comprising the following steps:
- providing a female mould comprising a female mould cavity with heating and cooling means,
- providing first, second, and third polymeric materials selected among thermoplastic polymers, and providing a blowing agent, wherein the blowing agent is a substance which is capable of producing a cellular structure in the second polymeric material upon heating above an activation temperature
- filling the mould cavity with the first, second, and third polymeric materials and blowing agent in the following sequence:
  - a first batch of the first polymeric material is laid into the mould cavity,
  - a second batch comprising a mixture of the second polymeric material and a blowing agent is placed over the first batch of the first polymeric material, and
  - a third batch of the third polymeric material is laid over the second batch, and
- closing the thus filled cavity with a lid to form a mould defining a closed cavity (10c) of constant volume in time,
- heating the mould to a processing temperature, which is above the melting temperature of all of the first, second, and third polymeric materials and is above the activation temperature,
- after a process time at the processing temperature, cooling the mould to or below a demoulding temperature, and
- removing the lid to open the cavity and extracting the polymeric article thus produced.

wherein,
  the second polymeric material and preferably the first and third polymeric materials comprise at least 50 wt. % of recycled polymer in the form of shredded flakes comprising first and second main surfaces separated from one another by a thickness, wherein the mean thickness of the flakes is comprised between 0.1 and 10 mm, preferably between 0.5 and 5 mm, and the mean hydraulic diameter, Dh=4 A/P, of the first and second main surfaces is comprised between 5 and 150 mm, preferably between 10 and 75 mm, wherein A is an area and P a perimeter of each of the first and second main surfaces of the flakes.

The first and third polymeric materials of the first and third batches and preferably the second polymeric material of the second batch preferably have same compositions. Each of the first and/or second and/or third polymeric material can be composed of more than one recycled polymer type. Independently of one another, the first, second, and third polymeric materials may comprise at least 50 wt. % of one of PE, PP, PA, PET, PBT, ABS, PPS, PEI, PES, PEEK, and PEKK, or mixtures or blends thereof, preferably as recycled polymers.

In a preferred embodiment, one or more of the first, second, and third batches are enclosed in a bag under vacuum prior to filling the female mould cavity therewith To enhance reproducibility and homogeneity of the blowing agent distribution in the second batch, the mixture of the second polymeric material and blowing agent can be in the form of an extruded film or profile of the polymer loaded with the blowing agent. Both first and third polymeric materials are in the form of flakes as defined supra. The blowing agent can comprise one or more organic compounds selected among azodicarbonamide, p, p'-oxybis (benzenesulfonyl hydrazide) P-toluenesulfonyl hydrazide, benzenesulfonyl hydrazide or inorganic compounds such as sodium or potassium hydrogencarbonate.

The blowing agent is preferably present in the second batch in an amount comprised between 0.2 to 5 wt. %, preferably between 0.5 and 2 wt. %, more preferably between 1 and 1.5 wt. % with respect of the total weight of blowing agent (2b) and second polymeric material (2p).

The first and/or third batches, and optionally the second batch, may comprise additives including,
- reinforcing fibres selected among glass fibres, carbon fibres, basalt fibres, aramid fibres, natural fibres
- particles selected among carbon black, metal powder or flakes, pigments,
- UV stabilizers or fire retardants.

To enhance the surface finish and/or to change the colour of the first or second skins, one or more polymeric films can be placed between a surface of the female mould cavity and the first and/or third batches of first and/or third polymeric material.

The polymeric article produced by the present process can be one of a utility pole, fencing post, utility pole anchor block in the ground, cable/ducting channel and cover, kerbing, large diameter pipes used in road construction (e.g. greater than 500 mm diameter), sewage, or land drainage, pallets, traffic cone, directional sign and barrier.

BRIEF DESCRIPTION OF THE FIGURES

For a fuller understanding of the nature of the present invention, reference is made to the following detailed description taken in conjunction with the accompanying drawings in which:

FIG. 5: illustrates (a) a mould loading step for producing a composite utility pole and (b) a composite utility pole thus produced.

DETAILED DESCRIPTION OF THE INVENTION

Figure 1:
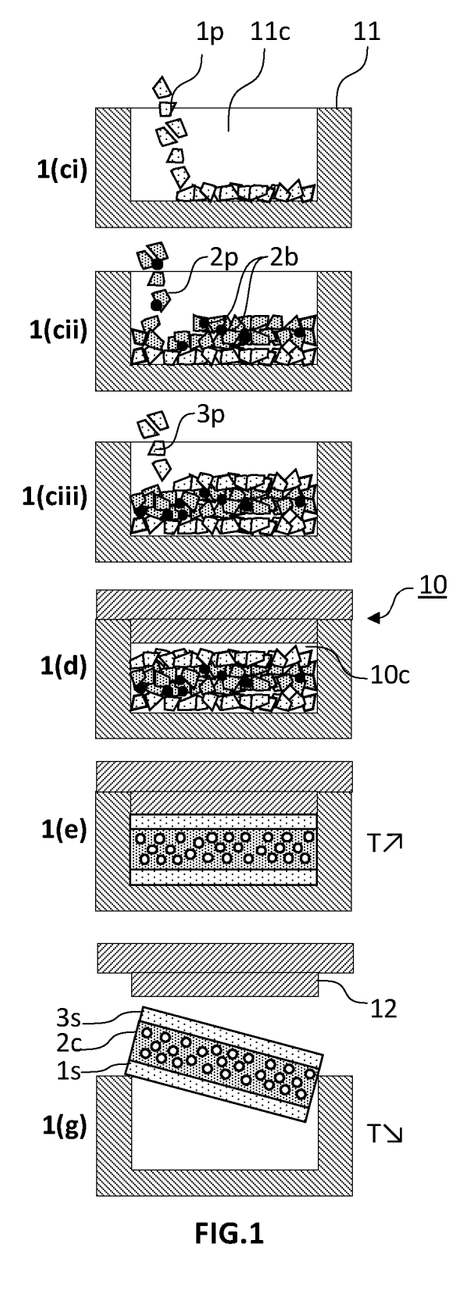
FIG. 1: illustrates the manufacturing steps of a process according to the present invention for the production of a foam core sandwich with polymeric skins.

As illustrated in FIG. 1, the present invention concerns a process for producing a polymeric article referred to as "enclosed pressure moulding" (EPM). The process comprises the steps of,
(a) providing a female mould (11) comprising a female mould cavity (11c) with heating and cooling means,
(b) providing first, second, and third polymeric materials (1p-3p) selected among thermoplastic polymers, and providing a blowing agent (2b), wherein the blowing agent is a substance which is capable of producing a cellular structure in the second polymeric material (2p) upon heating above an activation temperature
(c) filling the female mould cavity (11c) with the first, second, and third polymeric materials (1p-3p) and blowing agent (2b) in the following sequence:
- a first batch of the first polymeric material (1p) is laid into the female mould cavity (11c),
- a second batch comprising a mixture of the second polymeric material (2p) and a blowing agent (2b) is placed over the first batch of the first polymeric material, and
- a third batch of the third polymeric material (3p) is laid over the second batch, and (d) closing the thus filled cavity with a lid (12) to form a mould defining a closed cavity (10c) of constant volume in time,
(e) heating the mould (10) to a processing temperature, which is above the melting temperature of all of the first, second, and third polymeric materials (1p-3p) and is above the activation temperature,
(f) after a process time at the processing temperature, cooling the mould to or below a demoulding temperature, and
(g) removing the lid (12) to open the cavity and extracting the polymeric article thus produced.

According to the present invention, the second polymeric material (2p) and preferably the first and third polymeric materials (1p, 3p) comprise at least 50 wt. % of recycled polymer in the form of shredded flakes comprising first and second main surfaces separated from one another by a thickness, wherein the mean thickness of the flakes is comprised between 0.1 and 10 mm, preferably between 0.5 and 5 mm, and the mean hydraulic diameter, Δh=4 A/P, of the first and second main surfaces is comprised between 5 and 150 mm, preferably between 10 and 75 mm, wherein A is an area and P a perimeter of each of the first and second main surfaces of the flakes.

The flakes are produced by grinding waste polymeric material, without any further steps of pelletization in an extruder or without fine grinding it into a powder. The recycled polymeric flakes of the second polymeric material (2p) and, preferably, of the first and third polymeric materials (1p, 3p) are sorted, washed, and the like, but not processed any further into a different form before use in the process of the present invention. Depending on the requirements of a particular application, the waste polymeric material is sorted to various degrees to obtain a second polymeric material (2p) and, preferably, each of a first and third polymeric materials (1p, 3p), ranging from a composition comprising a single thermoplastic polymer type to a composition comprising a mix of various thermoplastic polymer types. The cost and homogeneity of a thus recycled material depend inter alia on the degree of sorting. The recycled polymeric material can comprise used articles such as bottles or other packaging made of a polymer and which are disposed of after use. Such recycled material requires washing prior to using it in the present process. Premium quality recycled polymeric material can be collected from containers manufacturers, which production lines generate scrape material which may not be used again for producing containers, but which is ideal for the present EPM process. Such recycled material can be shredded into flakes, if required, and used as such without any washing.

The first and third polymeric materials (1p, 3p) of the first and third batches preferably have the same composition. The second polymeric material (2p) is preferably adhesively compatible with the first and second polymeric materials.

Preferably, the second polymeric material (2p) is the same or of the same family as the first and third polymeric materials (1p, 3p).

If adhesion between the second polymeric material (2p) and the first and third polymeric materials (1p, 3p) is not satisfactory, a tie layer can be inserted between them. A tie layer is a layer which forms good adhesion with both polymers between which it is sandwiched and is used to enhance adhesion between adhesively incompatible polymers. The tie layer can be laid into the mould cavity in the form of films.

Depending on the application, the first and/or second and/or third polymeric materials can each be composed of more than one recycled polymer type. Mixing different polymeric materials in a batch generally degrades the properties of the corresponding layer, but also reduces the cost of the raw material, as fine sorting of the waste polymeric material is not necessary. In some applications, the cost reduction can outweigh a controlled loss of properties due to unsorted recycled polymeric materials. For example, the foam core does not substantially contribute to the flexural properties of an article, and the second batch may comprise more than one recycled polymer type. For example, a polymeric material may be available on the market at a cost of 1.5 €/kg for virgin polymer, which amounts to a cost for the raw material alone of 30 € for a 20 kg article. With a raw material cost of 0.2 €/kg for mixed recycled polymeric material, however, the same product has a raw material cost of 4 € only if the whole article is made of recycled polymeric material. Polymer moulding companies have struggled to compete with low cost materials like wood and concrete because of the relatively high cost of virgin plastic. The EPM process now offers a way of using low cost recycled materials to compete with wood and concrete in certain applications.

Independently of one another, the first, second, and third polymeric materials can comprise at least 50 wt. % in the form of flakes of recycled polymer selected from PE, PP, PA, PET, PBT, ABS, PPS, PEI, PES PEEK, and PEKK, or mixtures or blends thereof. In a preferred embodiment, at least 60 wt. %, preferably at least 80 wt. %, more preferably at least 90 wt. %, and most preferably 100 wt. % of the second polymeric material (2p) is in the form of flakes and preferably selected among the foregoing polymers. The first and third polymeric material can also comprise at least 10 wt. % of recycled polymers in the form of flakes, preferably at least 50 wt. %, more preferably at least 70 wt. %, more preferably at least 80 wt. %, and even 100 wt. %.

The blowing agent (2b) is preferably pre-blended with the second polymeric material (2p) prior to placing the second batch into the mould. The blowing agent is generally in powder form and can be mixed with the second polymeric material (2p) in a ratio of 0.2 to 5 wt. %, preferably of 0.5 to 2 wt. %, more preferably of 1 to 1.5 wt. % with respect of the total weight of blowing agent (2b) and second polymeric material (2p). Blowing agents can comprise one or more organic compounds selected among azodicarbonamide (ADCA), p, p'-oxybis (benzenesulfonyl hydrazide) P-toluenesulfonyl hydrazide, benzenesulfonyl hydrazide or inorganic compounds such as sodium or potassium hydrogencarbonate. Examples of blowing agents suitable for the present invention and available on the market include Tracel NC155, Tracel DB 160/50, Tracel DB 201/50, and Unicell OH, available at Tramaco GmbH (Germany).

The blowing agent is selected with an activation temperature to match the process temperature of the polymer. The second batch comprising the blowing agent and second polymeric material can be added to the mould at an amount of 150 to 900 kg/m$^3$, preferably 300 to 600 kg/m$^3$ occupied by the core in the final article.

Figure 2:
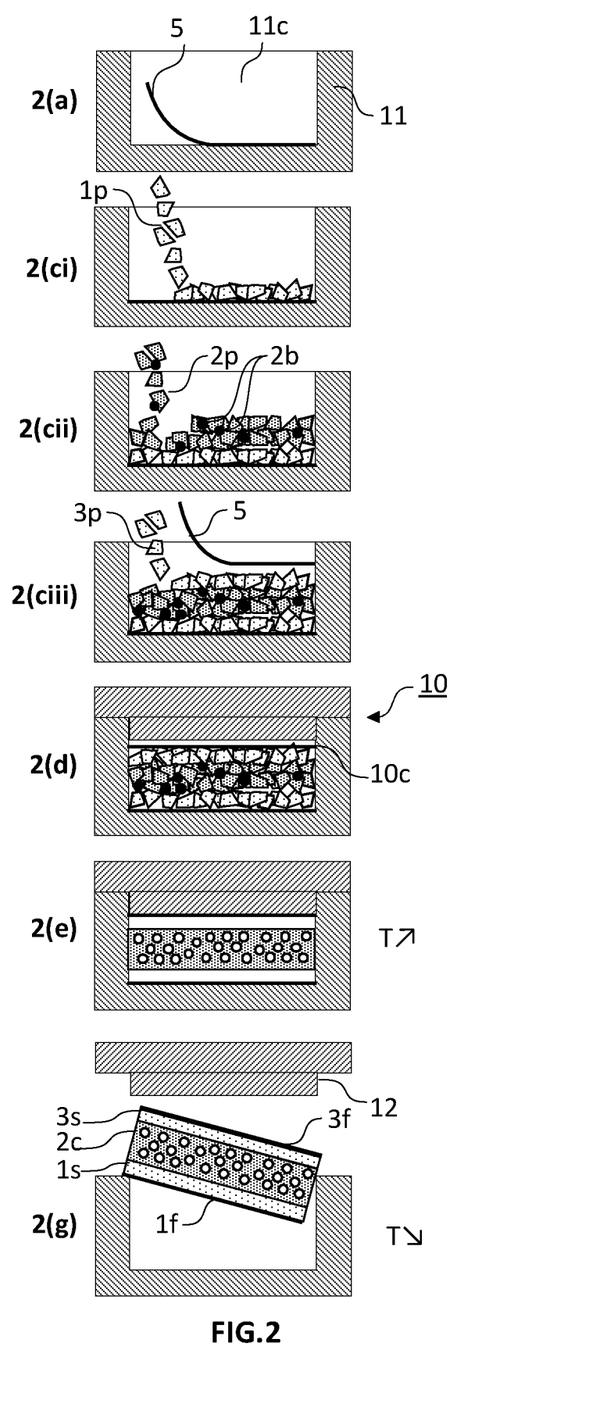
FIG. 2: illustrates the manufacturing steps of a process according to the present invention for the production of a foam core sandwich with skins with application of a surface film to enhance the surface finish or the colour of the article.
Figure 3:
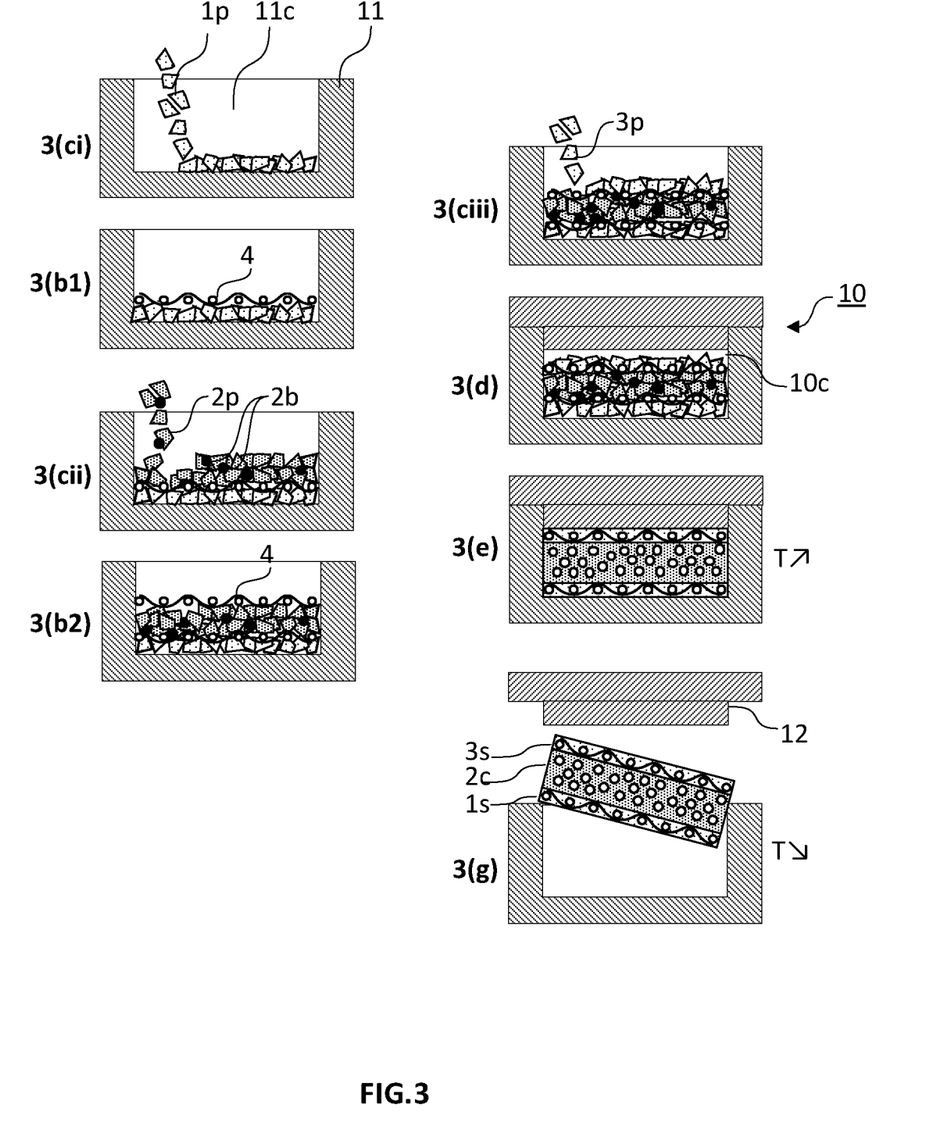
FIG. 3: illustrates the manufacturing steps of a process according to the present invention for the production of a foam core sandwich with fibre reinforced polymeric skins.

As illustrated in FIGS. 1 to 3, the first, second, and third polymeric materials (1p-3p) can be loaded into the female mould cavity (11c) as loose flakes. In order to make the material loading into the mould more efficient and reproducible, the recycled polymeric materials can be pre-formed prior to loading them into the female mould cavity. In a first embodiment, the first and/or second and/or third batch are heated and compressed in a preliminary and separate operation. This compacts the loose recycled plastic and allows for easier handling. This, however, also increase energy consumption and cost.

Figure 4:
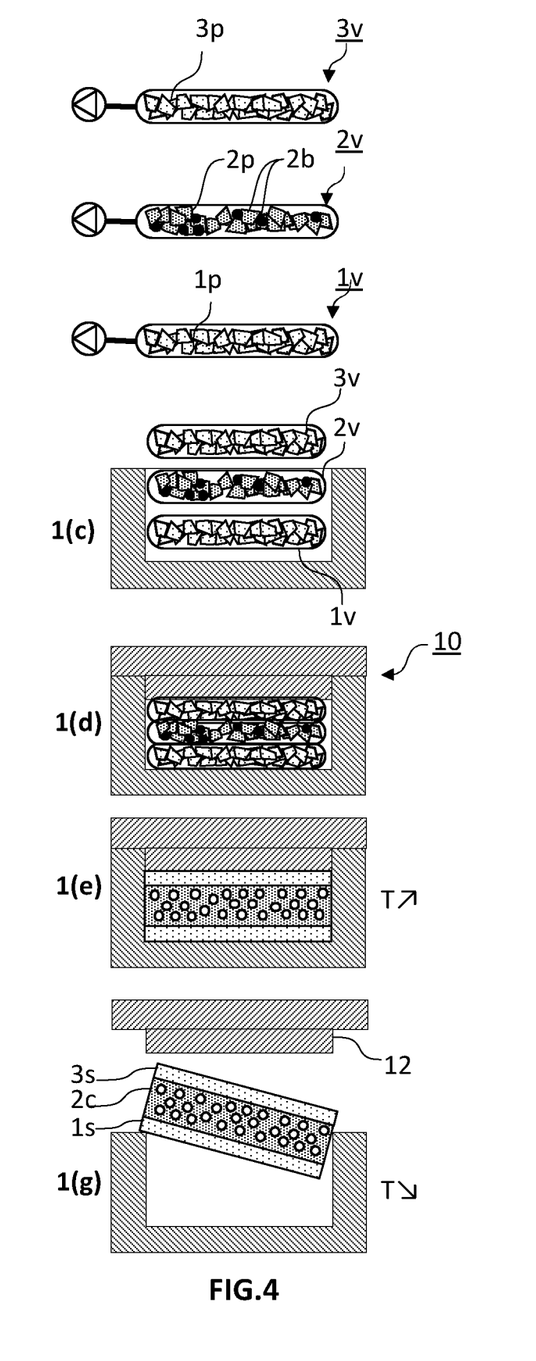
FIG. 4: illustrates the manufacturing steps of a process according to the present invention, wherein the first, second, and third batches are vacuum bagged prior to loading the female mould cavity.

In a second embodiment illustrated in FIG. 4 the loose polymeric flakes are placed into a bag and a vacuum is drawn. This also greatly compacts the material and greatly simplifies the loading of the female mould cavity, by simply sequentially laying the first, second, and third vacuum bagged batches (1v-3v) into the mould. The process is thus rendered more reproducible and the surface finish of the skins can also be enhanced by the vacuum bags forming a surface film. The vacuum bag material can be a low melt temperature polymer and is preferably the same as, similar to, or at least adhesively compatible with the first and third polymeric materials (1p, 3p), and preferably with the second polymeric material (2p) too. The bag can thus melt during the moulding process form an integral skin layer with the first and third polymeric materials. PE has successfully been used as a vacuum bag for producing an article made of PE. For large size articles having a thick foam core, the second batch forming the core of the sandwich can be filled not in a single but in several thinner bags, which are stacked on top of each other into the female mould cavity (10c).

In a third embodiment, the mixture of the second polymeric material and blowing agent is in the form of an extruded film or profile of the second polymeric material (2p) loaded with the blowing agent (2b). Both first and third polymeric materials are in the form of flakes as defined supra. The step of forming the extruded film or profile increases the cost of production but ensures repeatability of the process and a homogeneous distribution of the blowing agent (2b) within the second polymeric material (2p). The extrusion process temperature must be kept below the activation temperature of the blowing agent.

As illustrated in FIG. 2, a polymeric film (5) can be used to enhance the surface finish and/or colour of the article. A polymeric film made of a polymer which is adhesively compatible with the first and third polymeric materials (1p, 3p) of the first and second skins (1s, 3s), is laid onto the bottom of the female mould cavity (11c) prior to applying the first polymeric material (1p) (cf. FIG. 2(a)). This is followed by steps (c)(i)-(c)(iii) of applying the first, second, and third batches one over the other, and finished by laying a second polymeric film (5) on top of the third batch (cf. FIG. 2(ciii)). The mould is then closed, heated above the activation temperature, cooled, and opened as discussed earlier. This is particularly useful when the first and third polymeric materials (1p, 3p) forming the first and second skins (1s, 3s) comprises recycled material, as the use of recycled polymers can be detrimental to the surface finish and colour of the article.

Intermediate layers can be intercalated between the skins (1s, 3s) and core (2c). Tie layers were discussed supra, for enhancing adhesion between the skins and the core. As illustrated in FIG. 3, reinforcing fibres (4) can be added. If the application requires higher flexural strength, the skins can be reinforced with reinforcing fibres by laying a fibre bed on top of the first batch, and on top of the second batch, so that the reinforcing fibres are located between the first and second batches and between the second and third batches (cf. FIGS. 3(*b*1) and 3(*b*2)). Upon heating the mould above the melting temperatures of the polymeric materials (1*p*-3*p*) and above the activation temperature of the blowing agent (2*b*), pressure is generated inside the mould cavity (10*c*) driving the impregnation of the fibre beds by the first and third polymeric materials (1*p*, 3*p*), yielding a foam core sandwich polymeric article with fibre reinforced skins (1*s*, 3*s*). Preferential impregnation of the fibre bed by the first and third polymeric materials (1*p*, 3*p*) over the second polymeric material (2*p*) can be achieved by selecting the viscosities of the first and third polymeric materials to be lower than the viscosity of the second polymeric material at the processing temperature.

The reinforcing fibres (4) can be in the form of short fibres, preferably preformed in a non-woven fabric. Alternatively, the reinforcing fibres can be long or continuous, and in the form of fabrics, which can be unidirectional, woven, braided, and the like. Any type of known reinforcing fibres can be used depending on the mechanical properties required by the application and on the adhesive compatibility with the first and second polymeric materials (1*p*, 3*p*). For example, the reinforcing fibres (4) can be glass fibres, carbon fibres, aramid fibres, basalt fibres, natural fibres such as sisal, hemp, and the like. The amount of reinforcing fibres used depends on the magnitude of the pressure generated in the mould cavity (10*c*), which must be sufficient to ensure substantial impregnation of the fibre bed by the first and third polymeric materials (1*p*, 3*p*). Alternatively, the fibre reinforcement used can be in the form of prepregs or towpregs, wherein the fibres are pre-blended with a polymeric material. For example, commingled fibres or powder impregnated fibres can be used. Of course, the use of such pre-blended reinforcing fibres increases the cost of the article, but also increases the mechanical properties.

The level of pressure required in the process is dictated by the raw materials being processed. The pressure must be sufficient to ensure that the melt is forced to fill out the entire cavity in the mould. In case of reinforcing fibres (4), the pressure must be sufficient to drive the impregnation of the reinforcing fibres by the first and third polymeric materials (1*p*, 3*p*) or, in case of pre-blended reinforcing fibres, to drive the impregnation and consolidation of the prepregs or towpregs.

The viscosity of the melts and, optionally, the presence of reinforcing fibres therefore decide how much pressure is needed. The level of pressure is controlled by the amount of blowing agent (2*b*) placed in the mould (10) and by the headspace volume, defined as the difference between the raw material volume loaded in the mould and the volume of the closed mould cavity (10*c*), which the blowing agent is allowed to expand into. The lower the headspace volume, the higher the pressure generated by a given amount of blowing agent (2*b*).

Preformed inserts can be moulded in the product. For example, metal, ceramic, or composite inserts can be positioned into the female mould cavity at an appropriate location. Upon heating the mould, the pressure generated by the blowing agent (2*b*) drives the melt around the insert which becomes an integral part of the article. Numerous functionalities can thus be added to articles produced by the present EPM process.

Besides reinforcing fibres, the first and/or second and/or third batches may comprise other additives, such as UV stabilizers, fire retardants, or particles selected among carbon black, metal powder or flakes, pigments, and the like.

The mould can be made of metal, such as steel or aluminium, or it can be made of a ceramic or composite material. The mould must define a closed cavity of constant volume in time. Contrary to injection moulding or compression moulding, no expensive pressure generating equipment is required since pressure is generated internally by the expansion of the second polymeric material (2*p*) and blowing agent (2*b*) upon heating above the activation temperature of the blowing agent. The mould must therefore be designed such as to resist the internal pressure generated during the heating of the mould.

The mould must be heated to the processing temperature, which is above the melting temperature of all of the first, second, and third polymeric materials (1*p*-3*p*) and is above the activation temperature of the blowing agent (2*b*). This can be achieved by placing the mould in an oven, with convection heat, or radiation heat, in particular infrared heaters. Alternatively, the mould may comprise integrated heating means such as electrical resistances or channels for circulating a hot fluid, like an oil. Induction heaters can also be used to heat the mould. Depending on the size of the mould, and the type and power of heating means used, typical heating rates can be of the order of 3 to 50° C./min, often of 5 to 25° C./min or 10 to 20° C./min.

The mould can comprise a female mould (11) provided with a female mould cavity (11*c*) and a lid (12) which fits the opening of the female mould cavity (11*c*) to form a mould defining a closed cavity (10*c*). The lid (12) can also define a cavity complementary with the female mould cavity (11*c*) to form the closed cavity (10*c*). For articles having a more complex geometry, the mould may comprise more than two mould components which can be disassembled to extract the article. Closing of the mould can be achieved by clamping or bolting the various components together. Clamping means can be integrated in the mould or can be part of a separate clamping structure. The clamping structure may be provided with stiffening ribs to reinforce the mould structure, which allows the weight of the mould to be reduced. This allows for a quicker heating and cooling of the mould.

As the mould is heated up above the melting temperatures of the first, second, and third polymeric materials (1*p*-3*p*) they soften and melt to flowing viscosities. As the temperature reaches the activation temperature of the blowing agent (2*b*), gas bubbles are generated and the second polymeric material (2*p*) forms a foam, generating pressure in the mould cavity (10*c*) in the process. The thus generated pressure drives the flow of the molten polymeric materials (1*p*-3*p*) to fill the mould cavity (10*c*) completely and, optionally, to impregnate a fibre bed.

The mould can be cooled with a cooling fluid such as cold water or oil or by blowing cold air. The cooling fluid can be circulated in channels running through the bulk of the mould material; the same channels can be used to heat and to cool the mould depending on whether a hot or cold fluid flows therethrough. Alternatively, cooling can be achieved via external means, such as a heat exchanger; a refrigerated chamber, and the like. Again, the lighter the mould the quicker the cooling thereof.

The EPM process of the present invention is most suited to manufacturing large thick-walled polymer/composite products because the process can use mixed recycled polymeric materials that are available on the market at low cost. This process offers an alternative to timber and concrete traditionally used for manufacturing articles such as for example utility poles (e.g., for holding electric wiring), fencing posts, utility pole anchor blocks in the ground, cable/ducting channels and covers, kerbing (with and without drainage), large diameter pipes used in road construction, sewage, land drainage, and the like, pallets. EPM can also be used for producing road furniture such as cones, directional signs and barriers.

Figure 5A:
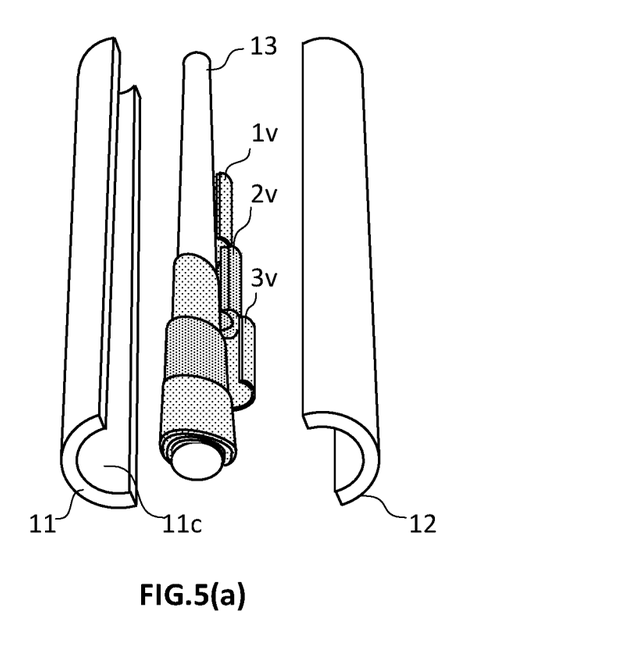
Figure 5B:
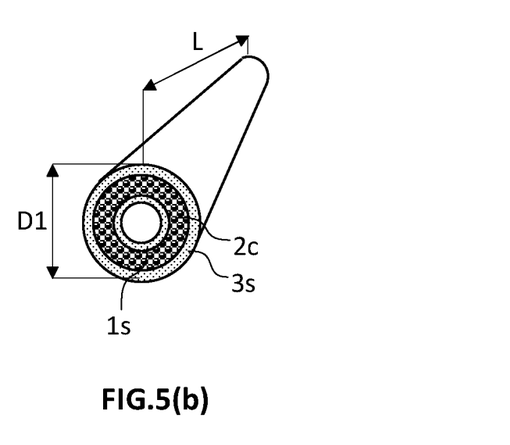

FIG. 5 illustrates how a hollow composite utility pole for supporting electric cables along the streets can be produced. The utility pole has a trunco-conical geometry with an outer diameter, D1, at the base of 300 mm, and a length, L, of 11 m. A mandrel (13) is provided, around which the various layers are applied in a preformed form, e.g., in vacuum bags (1v-3v) as discussed supra. Vacuum bags (1v-3v) can be successively wrapped around the mandrel (13), and locally welded in place by melting portions together. The first polymeric material (1p) forming the inner skin is a first mix of recycled thermoplastic polymers. The second polymeric material (2p) forming the foamed core (2c) is a second mix of recycled thermoplastic polymers comprising at least 1 wt. % of blowing agent, based on the total weight of the polymeric material. The third polymeric material (3p) forming the outer skin is a third mix of recycled thermoplastic polymers, preferably similar to the first mix. A UV stabilizer was added to the third mix and unidirectional and woven continuous glass fibres are alternatively included in the third vacuum bag (3v) to stiffen the outer skin (3s) of the pole. The half-shells (11, 12) of the mould can then be closed upon the thus wrapped mandrel, heated at processing temperature to drive melting of the polymeric materials (1p-3p), expansion of the blowing agent (2b) and generation of pressure to drive impregnation of the glass fibres and consolidation between the foam core (2c) and the first and second skins (1s, 3s). The mould is then cooled, and the part extracted.

Because of the trunco-conical geometry of the post, a composite post cannot be produced by pultrusion. The production of a cylindrical post by pultrusion requires the use of expensive processing equipment and reinforcing fibres can only be oriented unidirectionally in the direction of pultrusion. Filament winding can be used to produce a trunco-conical or a cylindrical post, but the production cost would be very high, and unidirectional fibres could not be used to stiffen the outer skin (3s) over a 11 m long post.

| REF# | Feature |
|---|---|
| 1p | First polymeric material |
| 1s | First skin |
| 1v | Vacuum bagged first batch |
| 2b | Blowing agent |
| 2c | Foam core |
| 2p | Second polymeric material |
| 2v | Vacuum bagged second batch |
| 3p | Third polymeric material |
| 3s | Second skin |
| 3v | Vacuum bagged third batch |
| 4 | Reinforcing fibres |
| 5 | Polymeric surface film |
| 10 | mould |
| 10c | Mould cavity |
| 11 | Female mould |
| 11c | Female mould cavity |
| 12 | Mould lid |
| 13 | Mandrel |

The invention claimed is:

1. A process for producing a polymeric article comprising:
   (a) providing a female mould comprising a female mould cavity and providing heating and cooling means for heating and cooling the female mould cavity,
   (b) providing first, second, and third polymeric materials each independently being thermoplastic polymers, and providing a blowing agent, wherein the blowing agent is a substance which is capable of producing a cellular structure in the second polymeric material upon heating above an activation temperature,
   (c) filling the female mould cavity with the first, second, and third polymeric materials (1p-3p) and blowing agent (2 b) in the following sequence:
   a first batch of the first polymeric material is laid into the female mould cavity,
   a second batch comprising a mixture of the second polymeric material and 5 a blowing agent is placed over the first batch of the first polymeric material, and
   a third batch of the third polymeric material is laid over the second batch, and
   (d) closing the thus filled cavity with a lid (12) to form a mould (10) defining a closed cavity of constant volume in time,
   (e) heating the mould to a processing temperature, which is above the melting temperature of all of the first, second, and third polymeric materials and is above the activation temperature,
   (f) after a process time at the processing temperature, cooling the mould to or below a demoulding temperature, and
   (g) removing the lid to open the cavity and extracting the polymeric article thus produced,
   characterized in that,
   (h) the second polymeric material is at least 50 wt. % of recycled polymer in the form of shredded flakes comprising first and second main surfaces separated from one another by a thickness, wherein the mean thickness of the shredded flakes is between 0.1 and 10 mm, and the mean hydraulic diameter, $D_h = 4 A/P$, of the first and second main surfaces is comprised between 5 and 150 mm, wherein A is an area and P a perimeter of each of the first and second main surfaces of the shredded flakes.

2. The process according to claim 1, wherein the first and third polymeric materials of the first and third batches have same compositions.

3. The process according to claim 2, wherein the second polymeric material of the second batch and the first and third polymeric materials of the first and third batches all have same compositions.

4. The process according to claim 1, wherein the first and/or second and/or third polymeric materials are each composed of than one recycled polymer type.

5. The process according to claim 1, wherein independently of one another, the first, second, and third polymeric materials comprise at least 50 wt. % of one of polyethylene, polypropylene, polyamide, acrylonitrile butadiene styrene, polyethylene terephthalate, polyethylenimine, polyether sulfone, polyphenylene sulfide, polyether ether ketone, polyetherketoneketone, or mixtures or blends thereof.

6. The process according to claim 1, wherein one or more of the first, second, and third batches are enclosed in a bag under vacuum prior to filling the female mould cavity therewith.

7. The process according to claim 1, wherein the mixture of the second polymeric material and blowing agent is in the form of an extruded film or profile of the polymer loaded with the blowing agent, and both the first and third polymeric materials are in the form of the shredded flakes.

8. The process according to claim 1, wherein the blowing agent comprises one or more organic compounds selected among from the group consisting of: azodicarbonamide, p,p'-oxybis (benzenesulfonyl hydrazide) P-toluenesulfonyl hydrazide, benzenesulfonyl hydrazide and inorganic compounds.

9. The process according to claim 1, wherein the blowing agent is present in the second batch in an amount between 0.2 to 5 wt. %, with respect of the total weight of blowing agent and second polymeric material 1.

10. The process according to claim 1, wherein the first and/or third batches comprise additives including at least one of:
- reinforcing fibres selected among glass fibres, carbon fibres, basalt fibres, aramid fibres, and natural fibres,
- particles selected among carbon black, metal powder or flakes, pigments, or
- UV stabilizers or fire retardants.

11. The process according to claim 1, wherein one or more polymeric films are placed between a surface of the mould cavity and the first and/or third batches of first and/or third polymeric material to improve the surface appearance or colour of the polymeric article skins.

12. The process according to claim 1, wherein the polymeric article is one of a utility pole, fencing post, utility pole anchor block in the ground, cable/ducting channel and cover, kerbing, large diameter pipes, pallets, traffic cone, or directional sign and barrier.

13. The process according to claim 1, wherein the first and third polymeric materials are both at least 50 wt. % of recycled polymer in the form of the shredded flakes.

14. The process according to claim 1, wherein the mean thickness of the shredded flakes is between 0.5 and 5 mm.

15. The process according to claim 1, wherein the mean hydraulic diameter is between 10 and 75 mm.

16. The process according to claim 1, wherein the blowing agent is present in the second batch in an amount between 0.5 and 2 wt. %.

17. The process according to claim 1, wherein the blowing agent is present in the second batch in an amount between 1 and 1.5 wt. %.

* * * * *